United States Patent
Kweon et al.

(10) Patent No.: US 7,507,501 B2
(45) Date of Patent: Mar. 24, 2009

(54) POSITIVE ACTIVE MATERIAL COMPOSITION FOR RECHARGEABLE LITHIUM BATTERIES

(75) Inventors: Ho-Jin Kweon, Cheonan (KR); Jun-Won Suh, Cheonan (KR); Hyun-Sook Jung, Cheonan (KR)

(73) Assignee: Samsung SDI Co., Ltd., Suwon (KR)

( * ) Notice: Subject to any disclaimer, the term of this patent is extended or adjusted under 35 U.S.C. 154(b) by 0 days.

(21) Appl. No.: 10/092,300

(22) Filed: Mar. 7, 2002

(65) Prior Publication Data

US 2002/0142225 A1  Oct. 3, 2002

(30) Foreign Application Priority Data

Apr. 2, 2001 (KR) ............... 2001-17298

(51) Int. Cl.
*H01M 4/58* (2006.01)
*H01M 4/32* (2006.01)
*C01D 1/02* (2006.01)

(52) U.S. Cl. ............... 429/218.1; 429/231.95; 429/231.1; 429/223; 429/224; 429/231.6; 423/599; 423/594.4; 423/594.6

(58) Field of Classification Search ............ 429/231.95, 429/231.1, 223, 224, 231.3, 218.1, 231.9; 423/306, 463, 464, 465, 594.4, 594.6, 599; 252/182.1

See application file for complete search history.

(56) References Cited

U.S. PATENT DOCUMENTS

| | | | | |
|---|---|---|---|---|
| 3,480,474 A | * | 11/1969 | Reimer et al. ............... | 438/476 |
| 5,290,476 A | * | 3/1994 | Roesler et al. ............ | 252/186.3 |
| 5,292,601 A | | 3/1994 | Sugeno et al. | |
| 5,705,291 A | * | 1/1998 | Amatucci et al. ............ | 429/137 |
| 5,827,494 A | * | 10/1998 | Yano et al. ............... | 423/594.4 |
| 6,753,111 B2 | * | 6/2004 | Kweon et al. .......... | 429/231.95 |
| 6,797,435 B2 | * | 9/2004 | Kweon et al. .......... | 429/231.95 |
| 2002/0039682 A1 | * | 4/2002 | Bauerlein .................... | 429/223 |
| 2002/0071990 A1 | * | 6/2002 | Kweon et al. ............ | 429/231.1 |
| 2003/0003352 A1 | * | 1/2003 | Kweon et al. ............... | 429/137 |
| 2003/0054250 A1 | * | 3/2003 | Kweon et al. ............ | 429/231.1 |
| 2004/0018429 A1 | * | 1/2004 | Kweon et al. ............... | 429/232 |

FOREIGN PATENT DOCUMENTS

| | | | |
|---|---|---|---|
| JP | 09-171813 | * | 6/1997 |
| JP | 11-307098 | | 11/1999 |
| JP | 2000-353526 | | 12/2000 |
| JP | 2001-68113 | | 3/2001 |
| KR | 1999-34749 | | 5/1999 |
| KR | 2000-59655 | | 10/2000 |
| KR | 2002-67183 | | 8/2002 |

OTHER PUBLICATIONS

English abstract of Korean Publication No. 10-0261509 B1, no date available.

* cited by examiner

*Primary Examiner*—Raymond Alejandro
(74) *Attorney, Agent, or Firm*—Stein, McEwen & Bui, LLP

(57) ABSTRACT

A positive active material composition for a rechargeable lithium battery includes at least one lithiated compound, and at least one additive compound selected from the group consisting of a thermal-absorbent element-included hydroxide, a thermal-absorbent element-included oxyhydroxide, a thermal-absorbent element-included oxycarbonate, and a thermal-absorbent element-included hydroxycarbonate.

4 Claims, 9 Drawing Sheets

POSITIVE ACTIVE MATERIAL COMPOSITION FOR RECHARGEABLE LITHIUM BATTERIES

CROSS REFERENCE TO RELATED APPLICATION

This application is based on Korean Patent Application No. 2001-17298, which was filed in the Korean Industrial Property Office on Apr. 2, 2001, the disclosure of which is incorporated herein by reference.

BACKGROUND OF THE INVENTION

1. Field of the Invention

The present invention relates to a positive active material composition for a rechargeable lithium battery, and more particularly, to a positive active material composition for a rechargeable lithium battery having improved cycle-life and thermal-stability characteristics.

2. Description of the Related Art

Currently, commercially available rechargeable lithium batteries substantially generate 4V in that they have 3.7 V of average discharge potential. Such a battery is considered an essential element in the digital generation since it is an indispensable energy source for portable digital devices such as a mobile telephone, a notebook computer, a camcorder and so on, which are generally abbreviated as the 3C devices.

For the positive active material in the rechargeable lithium battery, expensive $LiCoO_2$ is used in more than 95% of the currently available batteries in the world market. In order to decrease costs of production, a great deal of effort is being exerted to find an alternative thereof to this positive active material. Although a rechargeable lithium battery using LiCoO2 powder as a positive active material has relatively good cycle-life characteristics and good flat discharging profiles, there are still demands for improvements in electrochemical properties, such as prolonged cycle-life and high power density characteristics.

As one scheme to satisfy such a demand, U.S. Pat. No. 5,292,601 discloses $LixMO_2$ (wherein M is an element selected from Co, Ni, or Mn; x is 0.5-1) as an alternative to using $LiCoO_2$ as a positive active material. U.S. Pat. No. 5,705,291 discloses a method for fabricating a rechargeable lithiated intercalation cell including the operations of mixing a coating composition including boron oxide, boric acid, lithium hydroxide, aluminum oxide, lithium aluminate, lithium metaborate, silicon dioxide, lithium silicate, or mixtures thereof, with a lithiated intercalation compound particulate, and fusing the coating compound at a temperature in excess of about 400° C. so as to coat the particulate with the fused coating compound.

However, there is still a demand for provision of a positive active material having an improved cycle-life performance.

SUMMARY OF THE INVENTION

It is an object of the present invention to provide a positive active material composition for a rechargeable lithium battery exhibiting prolonged cycle life and high thermal-stability characteristics.

Additional objects and advantages of the invention will be set forth in part in the description which follows and, in part, will be obvious from the description, or may be learned by practice of the invention.

In order to achieve the above and other objects, a positive active material composition for a rechargeable lithium battery according to an embodiment of the present invention includes a positive active material including at least one lithiated compound, and at least one additive compound selected from a thermal-absorbent element-included hydroxide, a thermal-absorbent element-included oxyhydroxide, a thermal-absorbent element-included oxycarbonate, or a thermal-absorbent element-included hydroxycarbonate.

According to an aspect of the present invention, the additive compound is the thermal-absorbent element-included hydroxide.

According to another aspect of the present invention, the thermal-absorbent element is selected from Mg, Al, Co, K, Na, Ca, Si, Ti, V, Sn, Ge, Ga, B, As, or Zr.

According to an aspect of the present invention, the thermal-absorbent element is one of Al and B.

According to another embodiment of the present invention, a method of preparing a positive active material composition for a rechargeable lithium battery includes drying a thermal-absorbent element or a thermal-absorbent element-included compound at a temperature at or between room temperature and 200° C. for at or between 1 and 24 hours to prepare an additive compound, and adding the additive compound to a positive active material to prepare the positive active material composition, where the additive compound is selected from a thermal-absorbent element-included hydroxide, a thermal-absorbent element-included oxyhydroxide, a thermal-absorbent element-included oxycarbonate, or a thermal-absorbent element-included hydroxycarbonate.

BRIEF DESCRIPTION OF THE DRAWINGS

A more complete appreciation of the invention, and many of the attendant advantages thereof, will be more readily apparent as the same becomes better understood by reference to the following detailed description when considered in conjunction with the accompanying drawings, wherein.

DETAILED DESCRIPTION OF THE EMBODIMENTS

Figure 1:
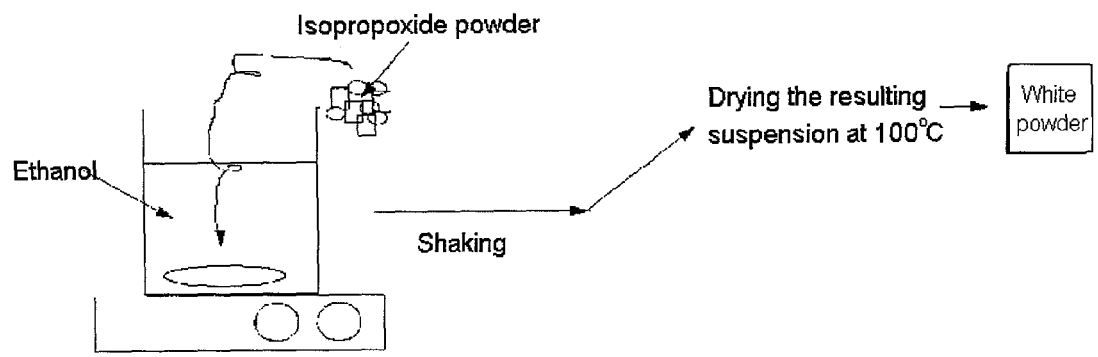
FIG. 1 is a schematic drawing illustrating the process for preparing a thermal-absorbent element-included hydroxide, a thermal-absorbent element-included oxyhydroxide, a thermal-absorbent element-included oxycarbonate, or a thermal-absorbent element-included hydroxycarbonate of the present invention.

Reference will now be made in detail to the present preferred embodiments of the present invention, examples of which are illustrated in the accompanying drawings and specific Examples, wherein like reference numerals refer to the like elements throughout. The embodiments are described below in order to explain the present invention by referring to the figures and specific Examples.

A positive active material composition for a rechargeable lithium battery of the present invention includes a positive active material and at least one additive compound. The additive compound helps to improve cycle-life characteristics and is selected from a thermal-absorbent element-included hydroxide, a thermal-absorbent element-included oxyhydroxide, a thermal-absorbent element-included oxycarbonate, or a thermal-absorbent element-included hydroxycarbonate.

The thermal-absorbent element may include any element capable of being dissolved in an organic solvent or water. According to an embodiment of the invention, the thermal-absorbent element includes one selected from Mg, Al, Co, K, Na, Ca, Si, Ti, V, Sn, Ge, Ga, B, As, or Zr, and preferably one of Al and B.

The additive compound can be in an amorphous or crystalline form. As shown in the embodiment of the invention in FIG. 1, the additive compound is prepared by drying a liquid including a thermal-absorbent source, such as a thermal-absorbent element or a thermal-absorbent-included compound at a range of temperature ranging from room temperature to 200° C. for 1 to 24 hours. The liquid in accordance with embodiments of the present invention may be in the form of a solution or a suspension, and is preferably in the form of an Al-included suspension or a B-included suspension.

Among the exemplary additive compounds, the thermal-absorbent element-included hydroxide has the best cycle-life and thermal-stability characteristics. Further, when Al is used for the thermal-absorbent element, an amorphous Al-included hydroxide is preferable, while when B is used for the thermal-absorbent element, a crystalline B-included hydroxide is preferable.

The liquid is prepared by adding the thermal-absorbent source to an organic solvent or water. The thermal-absorbent element-included source may be a thermal-absorbent element, a thermal-absorbent element-included alkoxide, a thermal-absorbent element-included salt, or a thermal-absorbent element-included oxide. Since the solubility of thermal-absorbent element varies depending upon the type of solvent, one having ordinary skill in the art can choose a suitable thermal-absorbent source according to the type of solvent to be used. For example, if an organic solvent is used as the solvent, the liquid can be obtained by dissolving any one of the thermal-absorbent element, the thermal-absorbent element-included alkoxide, the thermal-absorbent element-included salt, or the thermal-absorbent element-included oxide in the organic solvent or by refluxing the resultant mixture. When water is used as the solvent, the liquid can be obtained by adding either the thermal-absorbent element-included salt or the thermal-absorbent element-included oxide to the water or by refluxing the resultant mixture. As an example of the thermal-absorbent source, tetraethylorthosilicate may be used as a silicon source, $HB(OH)_2$, $B_2O_3$, or $H_3BO_3$ may be used as a boron source, and a vanadate such as ammonium vanadate ($NH_4(VO_3)$) or vanadium oxide ($V_2O_5$) may be used as a vanadium source.

Examples of the organic solvent include, but are not limited to, an alcohol (such as methanol, ethanol or isopropanol) hexane, chloroform, tetrahydrofuran, ether, methylene chloride, or acetone. The concentration of the thermal-absorbent source in the liquid is not limited as long as it is capable of converting itself to the thermal-absorbent element-included hydroxide, the thermal-absorbent element-included oxyhydroxide, the thermal-absorbent element-included oxycarbonate, the thermal-absorbent element-included hydroxycarbonate, or the thermal-absorbent element-included oxide during the drying or heat-treatment process.

If the drying process is carried out at a temperature lower than room temperature, the drying duration is unduly delayed. It is also undesirable to dry at a temperature higher than 200° C. because it becomes impossible to convert to the desired thermal-absorbent element-included hydroxide, the thermal-absorbent element-included oxyhydroxide, the thermal-absorbent element-included oxycarbonate, or the thermal-absorbent element-included hydroxycarbonate. Further, when the drying duration is shorter than 1 hour, the solvent is insufficiently evaporated, rendering a poor formation of the thermal-absorbent element-included hydroxide, the thermal-absorbent element-included oxyhydroxide, the thermal-absorbent element-included oxycarbonate, or the thermal-absorbent element-included hydroxycarbonate. However, if drying is longer than 24 hours, the resulting product may be broken.

Depending on the condition of the drying process, the additive compound may be formed such that each of the thermal-absorbent element-included hydroxide, the thermal-absorbent element-included oxyhydroxide, the thermal-absorbent element-included oxycarbonate, or the thermal-absorbent element-included hydroxycarbonate can be formed individually. Conversely, the additive compound be formed in the mixed form thereof. For example, when the drying process is performed under an atmosphere of carbonate gas, thermal-absorbent element-included oxycarbonate or thermal-absorbent element-included hydrocarbonate powders can be obtained.

The concentration of the additive compound of the present invention is preferable from 0.1 weight % to 1 weight %, and preferable from 0.1 weight % to 0.5 weight % based on the weight of the positive active material composition according to an embodiment of the invention. When the concentration is below 0.1 weight %, the effects of improving the cycle-life and thermal-stability characteristics to be obtained may not be sufficient. Whereas when the concentration is more than 1 weight %, the cycle-life characteristics are badly decreased. The present invention is advantageous since the additive compound is added in very small amounts, which according to an embodiment are amounts at or between 0.1 weight % and 1 weight %. However, it is understood that other concentrations are possible and have advantages over a conventional battery.

The positive active material of the present invention includes at least one lithiated compound selected from the group consisting of compounds represented by the formulas 1 to 13:

$$Li_xMn_{1-y}M_yA_2 \quad (1)$$

$$Li_xMn_{1-y}M_yO_{2-z}X_z \quad (2)$$

$$Li_xMn_2O_{4-z}X_z \quad (3)$$

$$Li_xMn_{2-y}M_yA_4 \quad (4)$$

$$Li_xCo_{1-y}M_yA_2 \quad (5)$$

$$Li_xCo_{1-y}M_yO_{2-z}X_z \quad (6)$$

$$Li_xNi_{1-y}M_yA_2 \quad (7)$$

$$Li_xNi_{1-y}M_yO_{2-z}X_z \quad (8)$$

$$Li_xNi_{1-y}Co_yO_{2-z}X_z \quad (9)$$

$$Li_xNi_{1-y-z}Co_yM_zA_\alpha \quad (10)$$

$$Li_xNi_{1-y-z}Co_yM_zO_{2-\alpha}X_\alpha \quad (11)$$

$$Li_xNi_{1-y-z}Mn_yM_zA_\alpha \quad (12)$$

$$Li_xNi_{1-y-z}Mn_yM_zO_{2-\alpha}X_\alpha \quad (13)$$

wherein, $0.95 \leq x \leq 1.1$, $0 \leq y \leq 0.5$, $0 \leq z \leq 0.5$, $0 \leq \alpha \leq 2$;

M is one element selected from the group consisting of Al, Ni, Co, Mn, Cr, Fe, Mg, Sr, V, and rare earth elements;

A is selected from the group consisting of O, F, S, and P; and

X is selected from the group consisting of F, S, and P.

According to an embodiment of the invention, the positive active material composition further includes a binder to enhance adhesion between the positive active material composition and the current collector that is applied with the composition. Examples of the binder include any conventional binder used in a positive active material composition, but preferably include polyvinylidene fluoride, polyvinyl chloride, and other similar binders. In another embodiment of the invention, the positive active material composition may further comprise a conductor to increase the conductivity. Examples of the conductor may include any conventional conductor used in the positive active material composition, but preferably include a carbon.

Upon fabricating a battery with the positive active material composition in which the additive compound is added, the battery obtains a lot of advantages, including enhanced discharging potential, increased power, prolonged duration of use due to enlarged power characteristics compared with the same size conventional battery, and improved thermal stability. Further, even by employing the relatively small amounts of the additive compound, the electrochemical characteristics can be dramatically enhanced.

Figure 14:
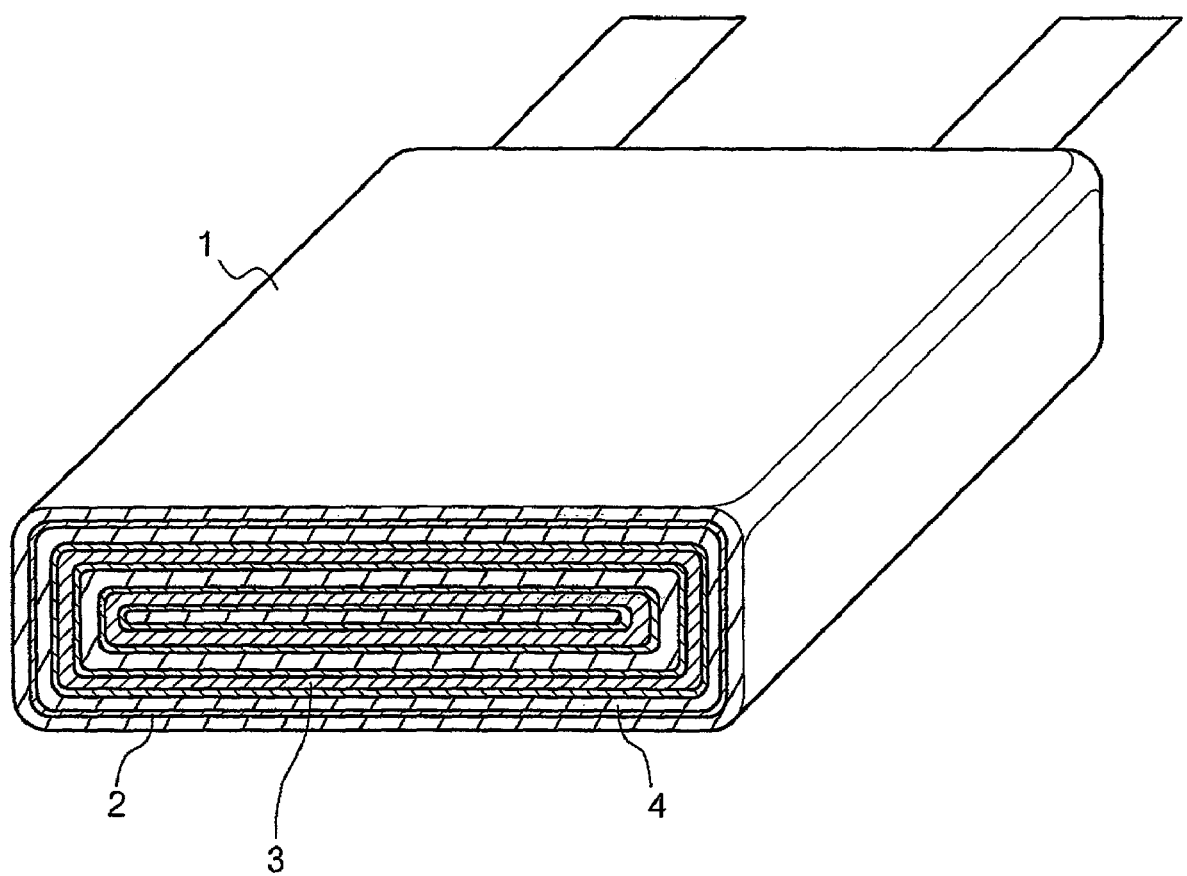
FIG. 14 shows a lithium battery according to an embodiment of the present invention.

A lithium battery according to an embodiment of the present invention is shown in FIG. 14 and includes a case 1 containing a positive electrode 3, a lithium counter electrode 4, and a separator 2 interposed between the positive electrode 3 and the lithium counter electrode 4. However, it is understood that other lithium batteries can be constructed using the positive active material according to the present invention.

The following examples illustrate the present invention in further detail. However, it is understood that the present invention is not limited by these examples.

EXAMPLE 1

5 g of Al-isopropoxide powder was mixed with 95 g of ethanol, and the resultant mixture was stirred for about 4 hours to provide a white, milky Al-isopropoxide suspension. The suspension was dried in an oven at 100° C. for 10 hours to obtain a white Al(OH)$_3$ powder.

A LiCoO$_2$ powder positive active material, the resulting Al(OH)$_3$ powder, a carbon conductor, and a polyvinylidene fluoride binder were mixed in the weight ratio of 93.5:0.5:3:3 with a N-methyl pyrrolidone solvent to obtain a positive active material slurry.

The positive active material slurry was cast in a thickness of 100 μm on a 25 μm thick Al foil, followed by cutting the cast foil in a circle form with a diameter of 1.6 cm to provide a coin-type positive electrode. Using the formed positive electrode, a fresh lithium counterpart electrode, and a 1 M LiPF$_6$ electrolyte solution of ethylene carbonate (EC) and dimethyl carbonate (DEC) (1:1 volume ratio), a 2016-type coin-type half-cell was fabricated in a glove box.

EXAMPLE 2

A coin-type half-cell was fabricated by the same procedure as in Example 1, except that the weight ratio of the positive active material, the Al(OH)$_3$ powder, the carbon conductor, and the polyvinylidene binder was altered to 93.9:0.1:3:3.

EXAMPLE 3

A coin-type half-cell was fabricated by the same procedure as in Example 1, except that the weight ratio of the positive active material, the Al(OH)$_3$ powder, the conductor, and the binder was altered to 93.1:0.9:3:3.

COMPARATIVE EXAMPLE 1

A positive active material slurry was prepared by dissolving a LiCoO$_2$ positive active material, a carbon conductor, and a polyvinylidene fluoride binder in the weight ratio of 94:3:3 in a N-methyl pyrrolidone solvent.

Using the prepared positive active material slurry, the coin-type half-cell was fabricated by the same procedure as in Example 1.

REFERENCE EXAMPLE 1

A coin-type half-cell was fabricated by the same procedure as in Example 1, except that the weight ratio of a positive active material, an Al(OH)$_3$ powder, a carbon conductor, and a polyvinylidene fluoride binder was altered to 93:1:3:3.

REFERENCE EXAMPLE 2

A coin-type half-cell was fabricated by the same procedure as in Example 1, except that the weight ratio of the positive active material, the Al(OH)$_3$ powder, the carbon conductor, and the polyvinylidene fluoride binder was altered to 89:5:3:3.

REFERENCE EXAMPLE 3

A positive active material slurry was prepared by dissolving a LiCoO$_2$ positive active material, an Al(OH)$_3$ powder, a carbon conductor, and a polyvinylidene fluoride binder in the weight ratio of 93.5:0.5:3:3 in N-methyl pyrrolidone solvent. The Al(OH)$_3$ powder is commercially available.

Using the prepared positive active material slurry, a coin-type half-cell was fabricated by the same procedure as in Example 1.

REFERENCE EXAMPLE 4

A coin-type half-cell was fabricated by the same procedure as in Reference Example 3, except that the weight ratio of a positive active material, an Al(OH)$_3$ powder, a carbon conductor, and a polyvinylidene fluoride binder was altered to 93:1:3:3.

REFERENCE EXAMPLE 5

A coin-type half-cell was fabricated by the same procedure as in Reference Example 3, except that the weight ratio of a positive active material, an Al(OH)$_3$ powder, a carbon conductor, and a polyvinylidene fluoride binder was altered to 89:5:3:3.

Figure 2:
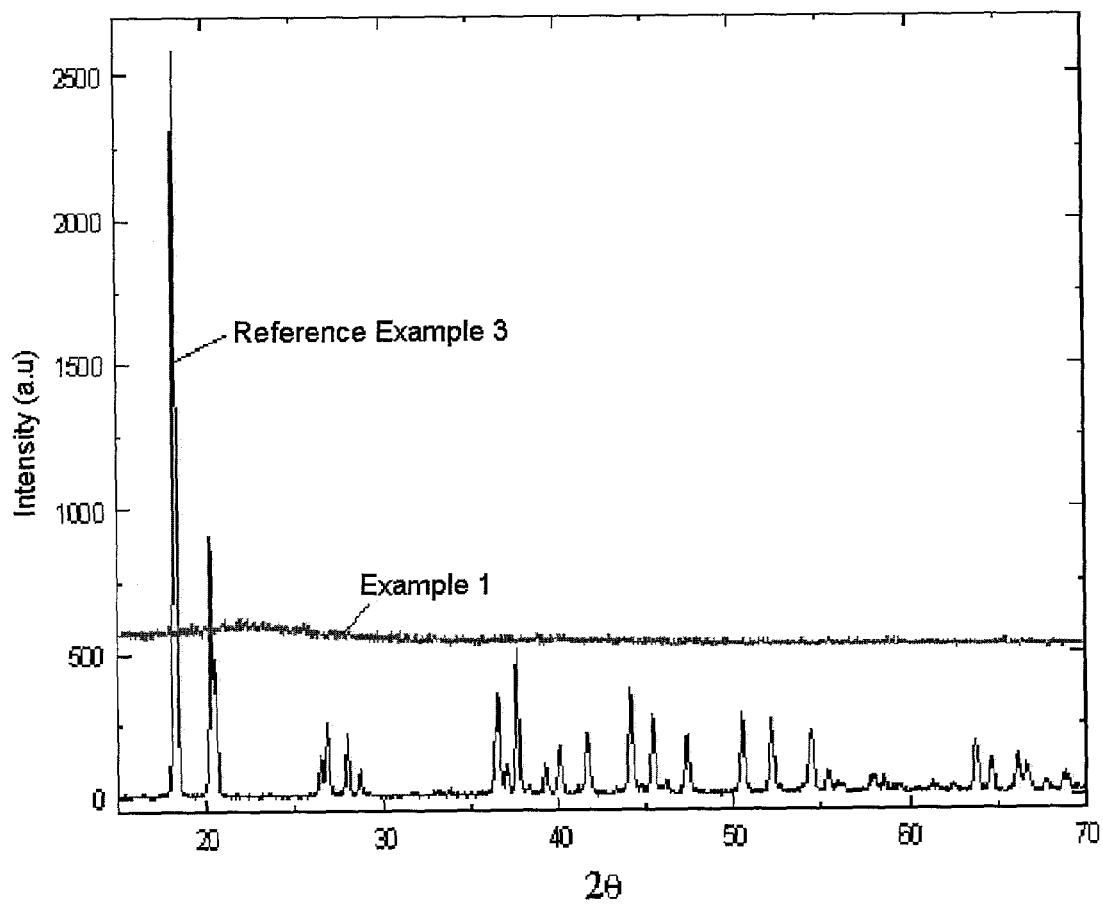
FIG. 2 is a graph showing XRD patterns of $Al(OH)_3$ according to Example 1 of an embodiment of the present invention and $Al(OH)_3$ according to Reference Example 3, which is commercially available.

FIG. 2 shows a graph illustrating XRD patterns of Al(OH)$_3$ powder of Example 1 of an embodiment of the present invention and the commercially available Al(OH)$_3$ powder of Reference Example 3. As shown in FIG. 2, the Al(OH)$_3$ powder prepared by drying the Al-isopropoxide suspension according to Example 1 is amorphous, while the commercially available Al(OH)$_3$ powder of Reference Example 1 is crystalline.

Figure 3:
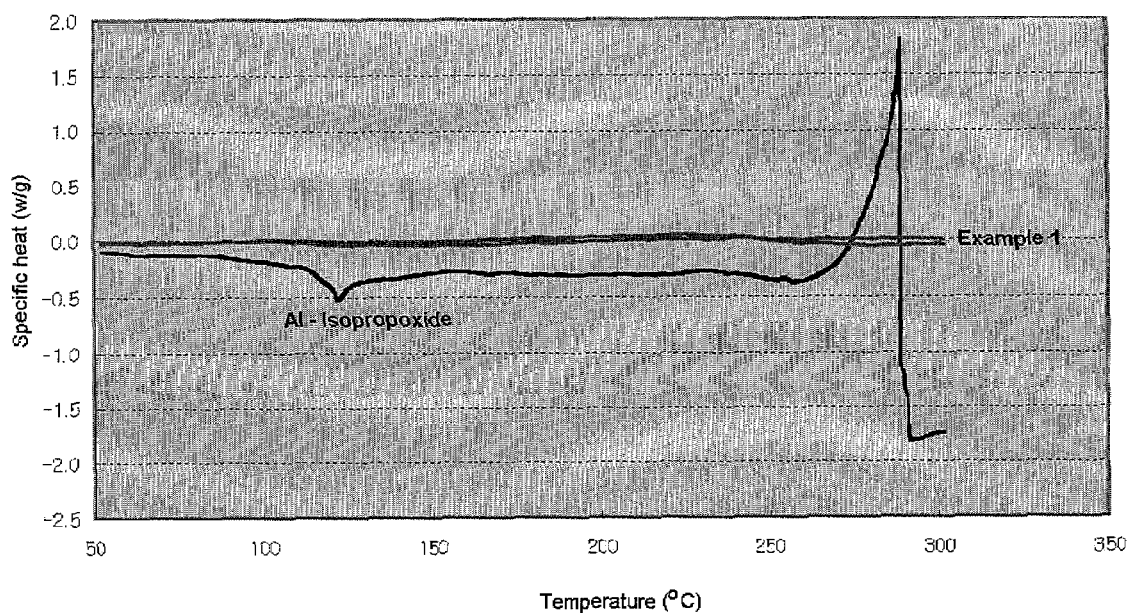
FIG. 3 is a graph showing DSC results of $Al(OH)_3$ according to Example 1 of an embodiment of the present invention and Al-isopropoxide.

FIG. 3 shows a graph illustrating DSC results of Al-isopropoxide powder and Al(OH)$_3$ powder according to the embodiment of the invention in Example 1. The DSC was measured using a model 910 DSC (manufactured by TA Instruments). The Al-isopropoxide powder exhibited a slight endothermic reaction and a significant exothermic reaction, while the Al(OH)$_3$ powder did not exhibit any exothermal phenomenon at all. Accordingly, it is anticipated that the Al(OH)$_3$ powder improves thermal stability of the battery when used in the battery according to the present invention.

Figure 4:
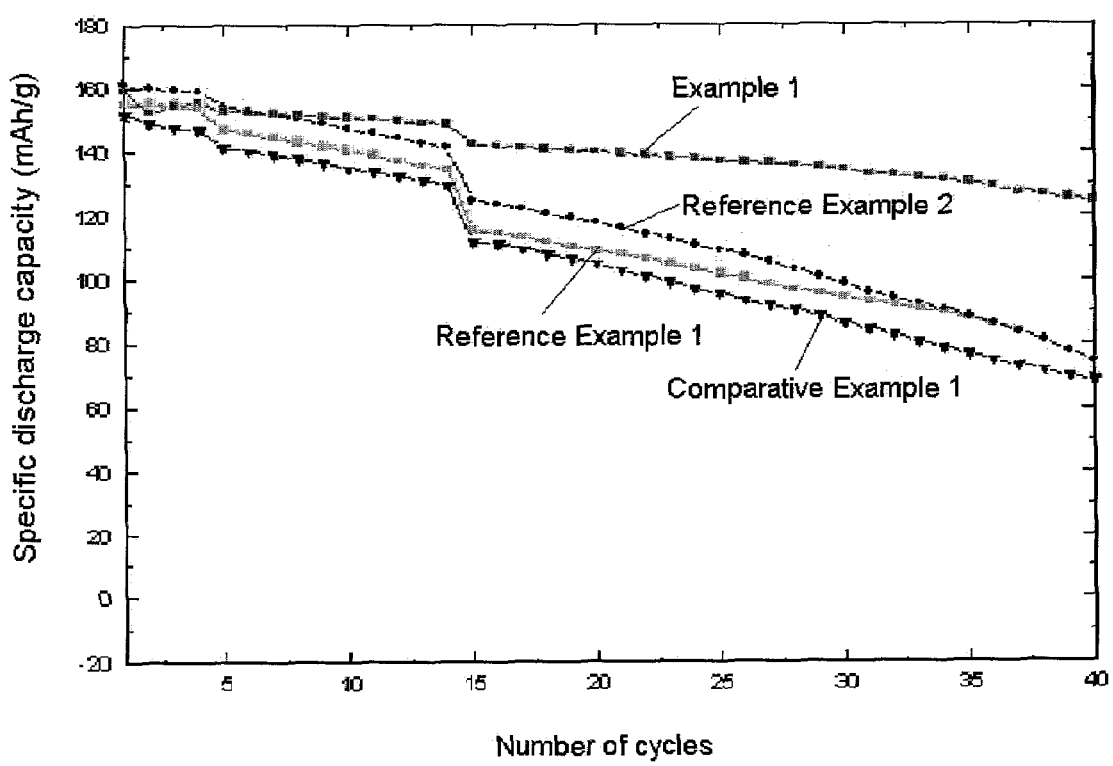
FIG. 4 is a graph showing cycle-life characteristics of coin-type half-cells fabricated using positive active material compositions according to Example 1 of an embodiment of the present invention, Reference Examples 1 and 2, and Comparative Example 1.

Further, in order to show the effects of adding the amorphous Al(OH)$_3$, the cycle-life characteristics were measured for coin-type half-cells fabricated according to Example 1, Reference Examples 1 and 2, and Comparative Example 1, and the results are illustrated in FIG. 4. As shown in FIG. 4, the coin-type half-cell of Example 1, in which 0.5 weight % of Al(OH)$_3$ was added, exhibits the best cycle-life characteristics. However, when the amounts of Al(OH)$_3$ are increased to 1 weight % (Reference Example 1) or to 5 weight. % (Reference Example 2), the cycle-life characteristics are similar to those when Al(OH)$_3$ is not added (Comparative Example 1).

Figure 5:
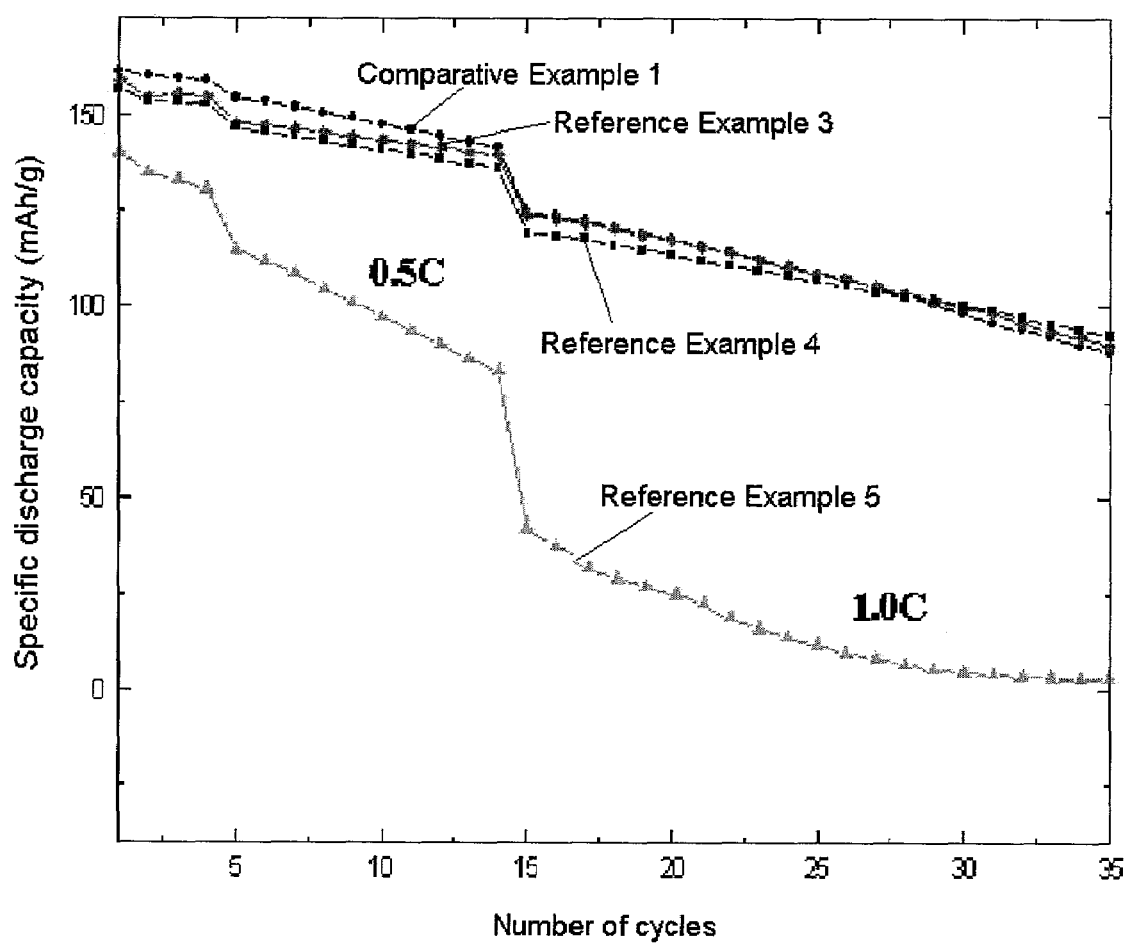
FIG. 5 is a graph showing cycle-life characteristics of coin-type half-cells fabricated using positive active material compositions according to Comparative Example 1 and Reference Examples 3 to 5.

In addition, in order to compare the cycle-life characteristics of the cell using commercial Al(OH)$_3$, the cycle-life characteristics were measured for coin-type half-cells fabricated according to Comparative Example 1 and Reference Examples 3 to 5, and the results are illustrated in FIG. 5. The cycle-life characteristics were measured between 4.3 V and 2.75 V by varying currents such as 0.1C$\leftrightarrows$0.1 C (1 cycle), 0.2C$\leftrightarrows$0.2 C (3 cycles), 0.5C$\leftrightarrows$0.5 C (10 cycles), and 1C$\leftrightarrows$1 C (21 cycles).

As shown in FIG. 5, for the cycle-life characteristics of the cell using commercially available Al(OH)$_3$, Reference Example 3 at the amount of 0.5 weight % exhibits cycle-life characteristics similar to or less than those of Comparative Example 1; Reference Example 4 at the amount of 1 weight % exhibits cycle-life characteristics less than those of Comparative Example 1; and Reference Example 5 at the amount of 5 weight % exhibits cycle-life characteristics remarkably less than those of Comparative Example 1.

As shown in FIGS. 4 and 5, it was found that, using commercially available Al(OH)$_3$, the cycle-life characteristics were not enhanced to the extent obtained in the present invention, and that the effects are not imparted in the case of using over 1 weight % of Al(OH)$_3$.

The cells fabricated by using active materials of Examples 2 and 3 exhibit XRD, DSC, and cycle-life characteristics similar to those of Example 1.

EXAMPLE 4

5 g of B$_2$O$_3$ powder was mixed with 95 g of ethanol and the resultant mixture was stirred for about 1 hour to provide a 5 wt % transparent B-solution. The solution was dried at 100° C. for 10 hours to obtain a white HB(OH)$_2$ particulate powder.

A LiCoO$_2$ positive active material, the HB(OH)$_2$ particulate powder, a carbon conductor, and a polyvinylidene fluoride binder were mixed in the weight ratio of 93.1:0.1:3:3 in N-methyl pyrrolidone fluoride solvent to obtain a positive active material slurry. Using the positive active material slurry, a coin-type half-cell was fabricated by the same procedure as in Example 1.

EXAMPLE 5

A coin-type half-cell was fabricated by the same procedure as in Example 4, except that the weight ratio of a LiCoO$_2$ positive active material, the HB(OH)$_2$ particulate powder, the carbon conductor, and the polyvinylidene fluoride binder was altered to 93.9:0.1:3:3.

EXAMPLE 6

A coin-type half-cell was fabricated by the same procedure as in Example 4, except that the weight ratio of the LiCoO$_2$ positive active material, the HB(OH)$_2$ particulate powder, the carbon conductor, and the polyvinylidene fluoride binder was altered to 93.7:0.3:3:3.

EXAMPLE 7

A coin-type half-cell was fabricated by the same procedure as in Example 4, except that the weight ratio of the LiCoO$_2$ positive active material, the HB(OH)$_2$ particulate powder, the carbon conductor, and the polyvinylidene fluoride binder was altered to 93.5:0.5:3:3.

EXAMPLE 8

A coin-type half-cell was fabricated by the same procedure as in Example 7, except that Li$_{1.03}$Ni$_{0.69}$Mn$_{0.2}$Co$_{0.9}$Al$_{0.07}$Mg$_{0.07}$O$_2$ was used as a positive active material.

COMPARATIVE EXAMPLE 2

A coin-type half-cell was fabricated by the same procedure as in Comparative Example 1, except that Li$_{1.03}$Ni$_{0.69}$Mn$_{0.2}$Co$_{0.9}$Al$_{0.07}$Mg$_{0.07}$O$_2$ was used as a positive active material.

REFERENCE EXAMPLE 6

A coin-type half-cell was fabricated by the same procedure as In Reference Example 1, except that a commercially available $B_2O_3$ was used instead of the commercially available $Al(OH)_3$ and the weight ratio of the positive active material, the commercially available $B_2O_3$, the carbon conductor, and the polyvinylidene fluoride binder was altered to 95.7:0.3:3:3.

REFERENCE EXAMPLE 7

A coin-type half-cell was fabricated by the same procedure as in Comparative Example 1, except that the weight ratio of a positive active material, a commercially available $B_2O_3$, a carbon conductor, and a polyvinylidene fluoride binder was altered to 94.45:0.55:3:3.

Figure 6:
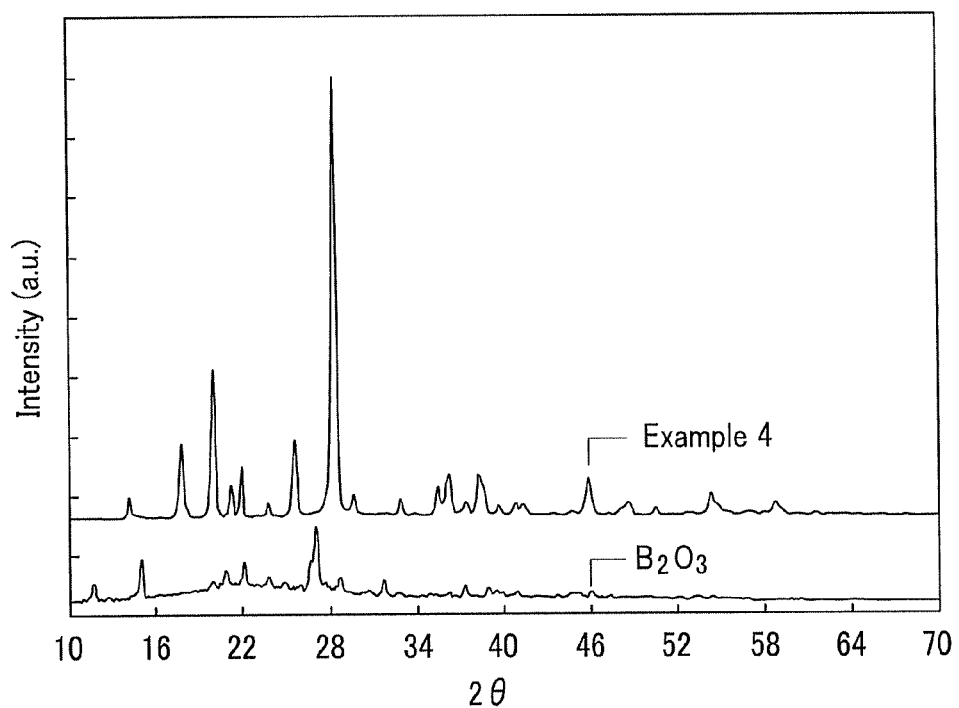
FIG. 6 is a graph showing XRD patterns of a $HB(OH)_2$ powder according to Example 4 of an embodiment of the present invention and commercially available $B_2O_3$.

To confirm the structure of $HB(OH)_2$ powder prepared by the method of Example 4, XRD patterns were measured for a powder prepared according to the embodiment of the invention in Example 4 and commercially available $B_2O_3$ (boron oxide), and the results are illustrated in a graph of FIG. 6. As shown in FIG. 6, the XRD pattern of commercially available $B_2O_3$ is not sharply featured, while the powder of Example 4 exhibits a single phase of XRD pattern. Since the XRD pattern of powder of Example 4 is identical to that of JCPDS Card No. 72-1067 material, it is confirmed as hydrogen borate ($HB(OH)_2$).

Figure 7:
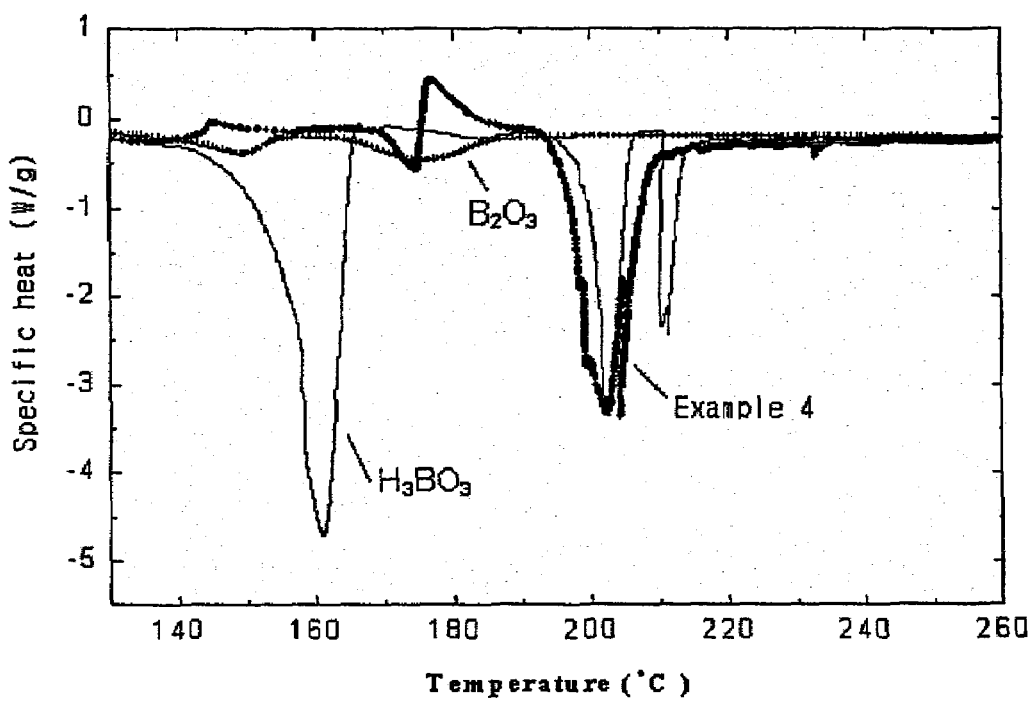
FIG. 7 is graph showing DSC results of $HB(OH)_2$ powder according to Example 4 of the present invention, $H_3BO_3$, and commercially available $B_2O_3$.

In addition, to show the thermal characteristics of $HB(OH)_2$ powder of Example 4, DSC was measured for a $HB(OH)_2$ powder of Example 4, commercially available $H_3BO_3$ (boric acid), and $B_2O_3$, and the results are illustrated in FIG. 7. As shown in FIG. 7, there are endothermic peaks for all three different powders, with each of the peaks presenting at different temperatures. Although the endothermic level of commercial $H_2BO_3$ is the largest, the level is presented at about 160° C. As typical lithiated compounds cause exothermic reactions around 200° C., the commercial $H_2BO_3$ cannot absorb the heat emitted from the lithiated compound so it is hard to provide a lithium battery with thermal stability with commercial $H_2BO_3$. Although both $HB(OH)_2$ powder and $B_2O_3$ exhibit endothermic reactions around 200° C., the endothermic level of $HB(OH)_2$ powder is more than 10 times that of $B_2O_3$, so it is anticipated that $HB(OH)_2$ powder gives remarkable effects of thermal stability in the lithium battery.

Figure 8:
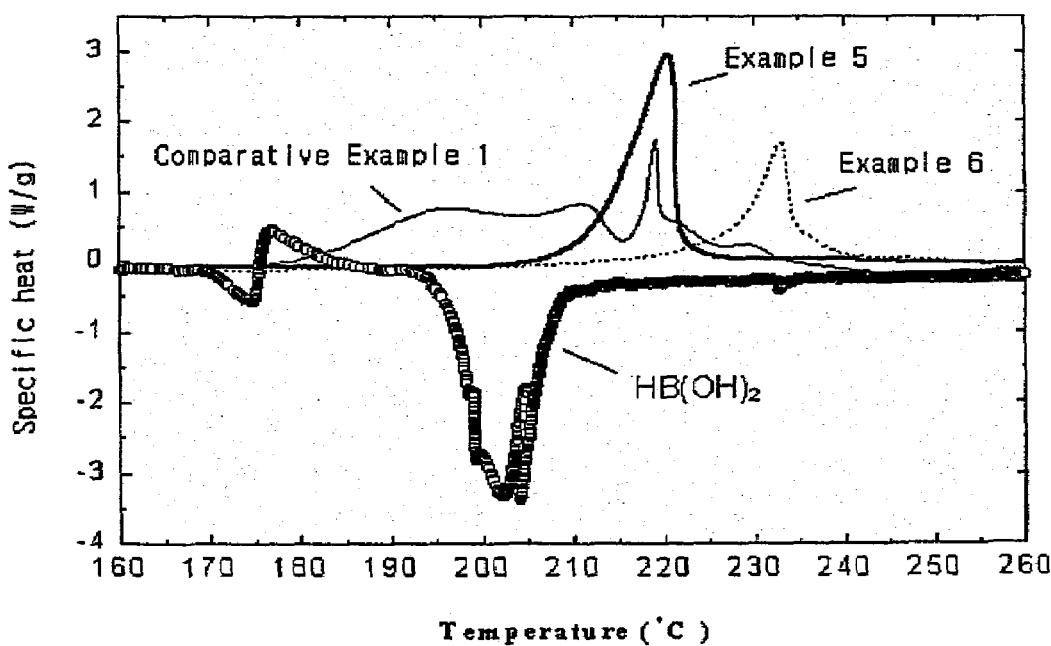
FIG. 8 is a graph showing DSC results of positive electrodes prepared using active material compositions of Examples 5 and 6 of embodiments of the present invention, a positive electrode of Comparative Example 1, and $HB(OH)_2$ powder of Example 4 of the present invention.

To find the thermal-stability effects of adding a $HB(OH)_2$ powder to the positive active material slurry, DSC were measured for coin-type half-cells fabricated according to Examples 5 and 6 and Comparative Example 1, and the results are illustrated in FIG. 8. For reference, the DSC result of $HB(OH)_2$ powder are illustrated in FIG. 8. The DSC was measured by model 910 DSC (manufactured by TA Instruments) using 10 mg of positive active material taken from a coin-type cell that was charged to 4.3 V and disassembled in a dry room to separate the positive active material from the positive electrode. As shown in FIG. 8, $HB(OH)_2$ powder exhibits a significant endothermic peak at around 200° C., whereas pure $LiCoO_2$ exhibits a significant exothermic peak between 200 and 220° C. This kind of exothermic reaction is caused by discomposing $O_2$ from the charged $Li_{1-x}Co_xO_2$ due to a weakening of the Co—O linkage and the reaction of the generated $O_2$ with the electrolyte. These reactions result in a degeneration of the thermal stability in the battery system. The present invention will, however, provide a battery with remarkably thermal stability by counterbalancing the exothermic reaction of $Li_{1-x}Co_xO_2$ with the endothermic reaction of $HB(OH)_2$ powder at around 200° C. As shown in the DSC results of Examples 5 and 6, this result is proven since the exothermic peaks disappear at around 200° C. As shown in FIG. 8, upon increasing the added amounts of $HB(OH)_2$ powder, the exothermic peak is moved to the higher temperature.

Figure 9:
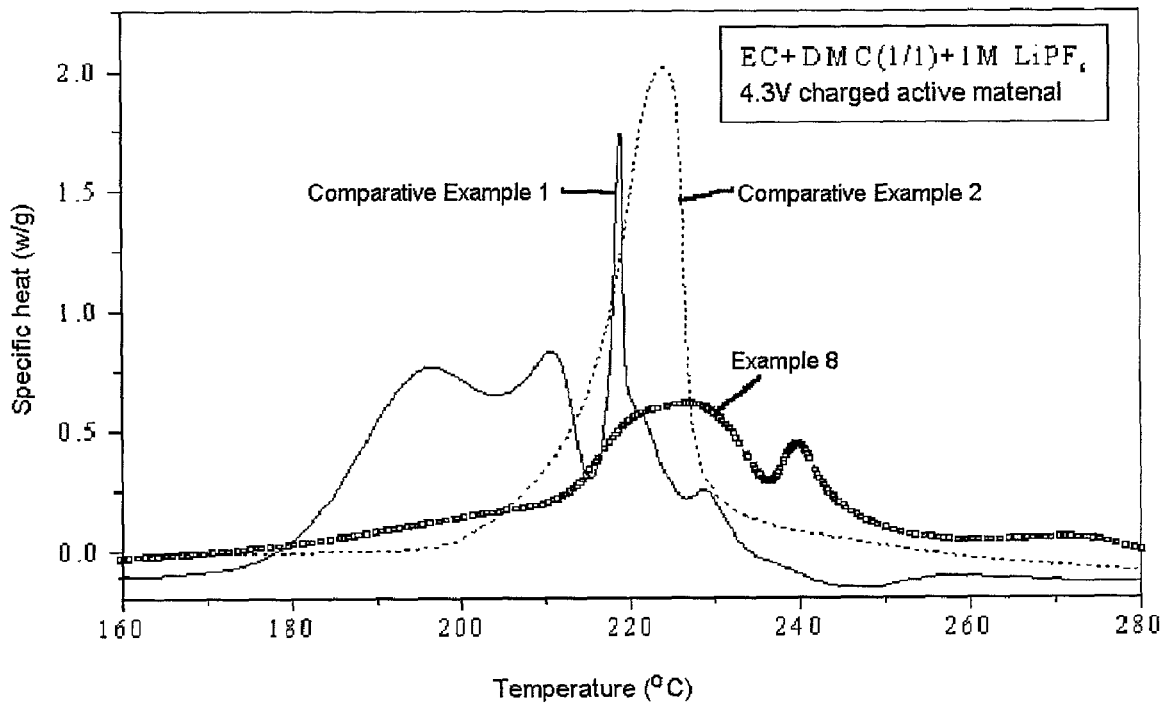
FIG. 9 is a graph showing DSC results of positive electrodes prepared using positive active materials according to Example 8 of an embodiment of the present invention and Comparative Examples 1 and 2.

To show the improved effects of thermal stability by adding a $HB(OH)_2$ powder to $Li_{1.03}Ni_{0.69}Mn_{0.2}Co_{0.9}Al_{0.07}Mg_{0.07}O_2$, DSC are measured for coin-type cells fabricated by Examples 8 and Comparative Example 2, and the results are illustrated in FIG. 9. In addition, the DSC result of Comparative Example 1 in which $LiCoO_2$ is used as a positive active material is represented in FIG. 8, for reference.

The DSC was measured by a model 910 DSC (manufactured by TA Instruments) using 10 mg of positive active material that was taken from a coin-type cell charged to 4.3 V and disassembled in a dry room to separate the positive active material form the positive electrode. Generally, $Li_{1.03}Ni_{0.69}Mn_{0.2}Co_{0.9}Al_{0.07}Mg_{0.07}O_2$ has an advantage of a narrow exothermic peak and a thermal decomposition temperature higher than that of $LiCoO_2$, but it also has a disadvantage of poor thermal stability since the exothermic peak is very sharp so as to suddenly emit the exothermic heat. As shown in FIG. 9, by adding $HB(OH)_2$ powder to the positive active material, the peak thereof becomes very broad, and the exothermic level (peak's area) is reduced so that the thermal stability is improved as compared to that of $LiCoO_2$ alone.

Figure 10:
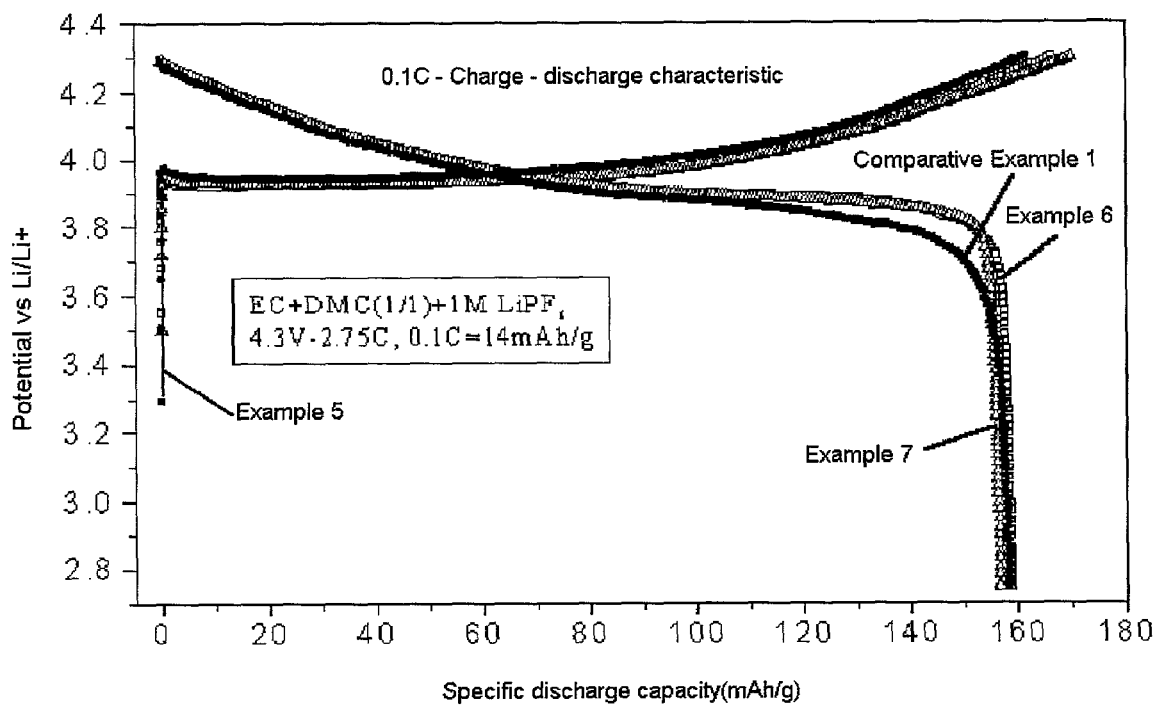
FIG. 10 is a graph showing 0.1C charge-discharge characteristic of coin-type half-cells fabricated according to Examples 5 to 7 of embodiments of the present invention and Comparative Example 1.
Figure 11:
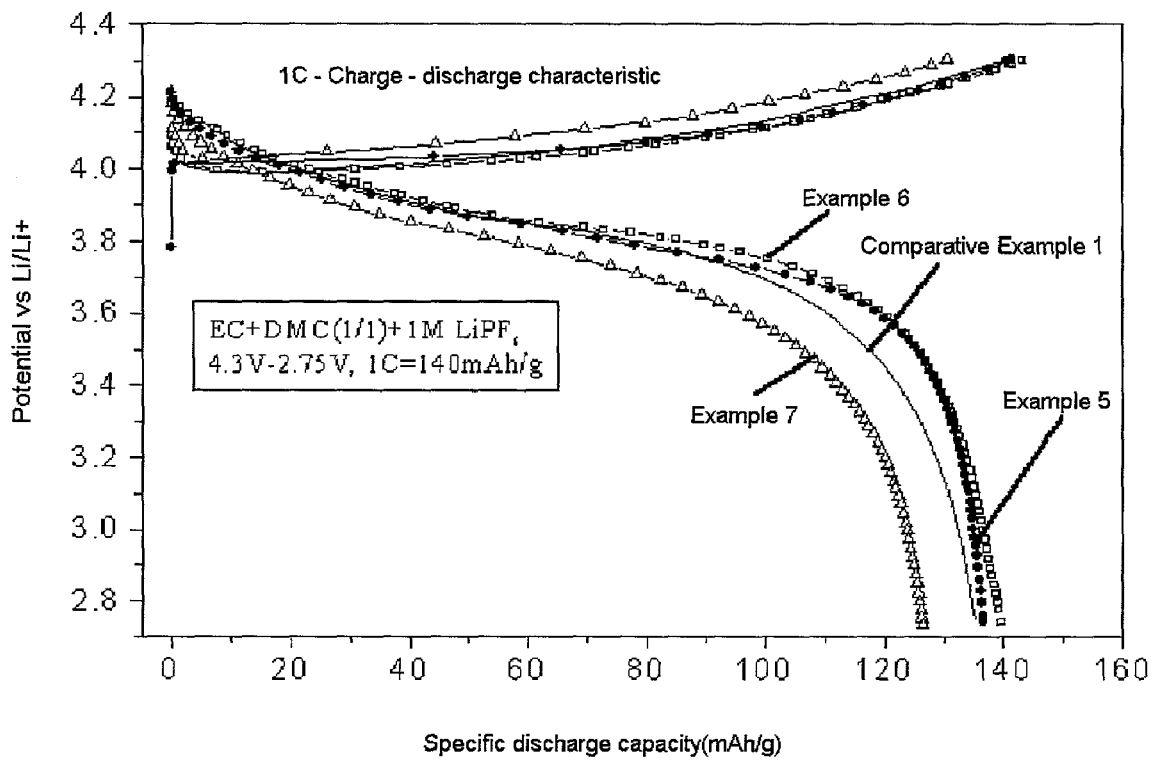
FIG. 11 is a graph showing 1C charge-discharge characteristic of coin-type half-cells fabricated by the methods of Examples 5 to 7 of embodiments of the present invention and Comparative Example 1.
Figure 12:
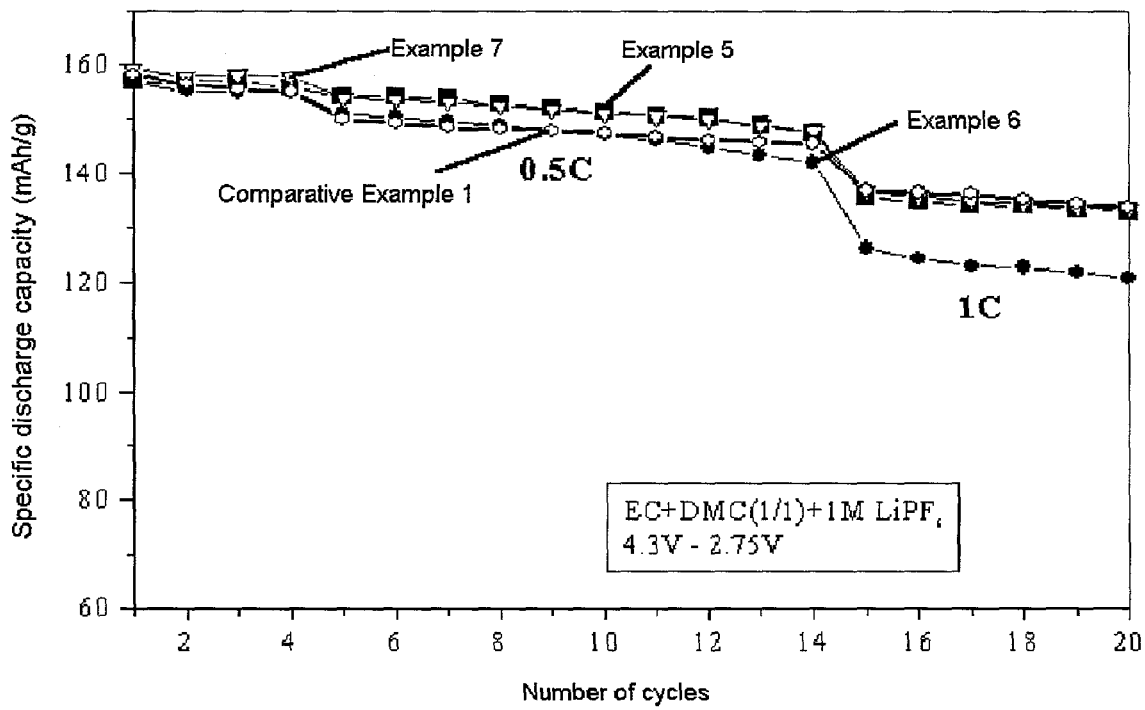
FIG. 12 is a graph showing cycle-life characteristic of coin-type half-cells fabricated by Examples 5 to 7 of embodiments of the present invention and Comparative Example 1.

FIGS. 10 and 11 show capabilities of embodiments of the invention in Examples 5, 6, and 7 and Comparative Example 1 at a low rate (0.1C) and at a high rate (1.0 C), respectively. FIG. 12 shows a graph illustrating cycle-life characteristics according to the charge and discharge rates in the coin-type cells of Examples 5, 6, and 7, and Comparative Example 1. As shown in FIGS. 10 to 12, although the capability and cycle-life characteristics are improved by adding $HB(OH)_2$ powder to the positive active material, the capability and cycle-life characteristics are degenerated at a high rate upon increasing the added amount of $HB(OH)_2$. Therefore, the capability and cycle-life characteristics are dramatically decreased by adding more than 1 weight % of $HB(OH)_2$ powder. It is found that the thermal stability is remarkably improved by adding $HB(OH)_2$ powder in even a small amount. Within the range of up to 0.5 weight %, the degeneration of electrochemical characteristics is minimized. Considering the current trends concerning safety, $HB(OH)_2$ powder will draw a great deal of interest from the market. Further, as shown in FIG. 12, the capability characteristics are degenerated upon adding commercial $B_2O_3$ to the positive active material.

Figure 13:
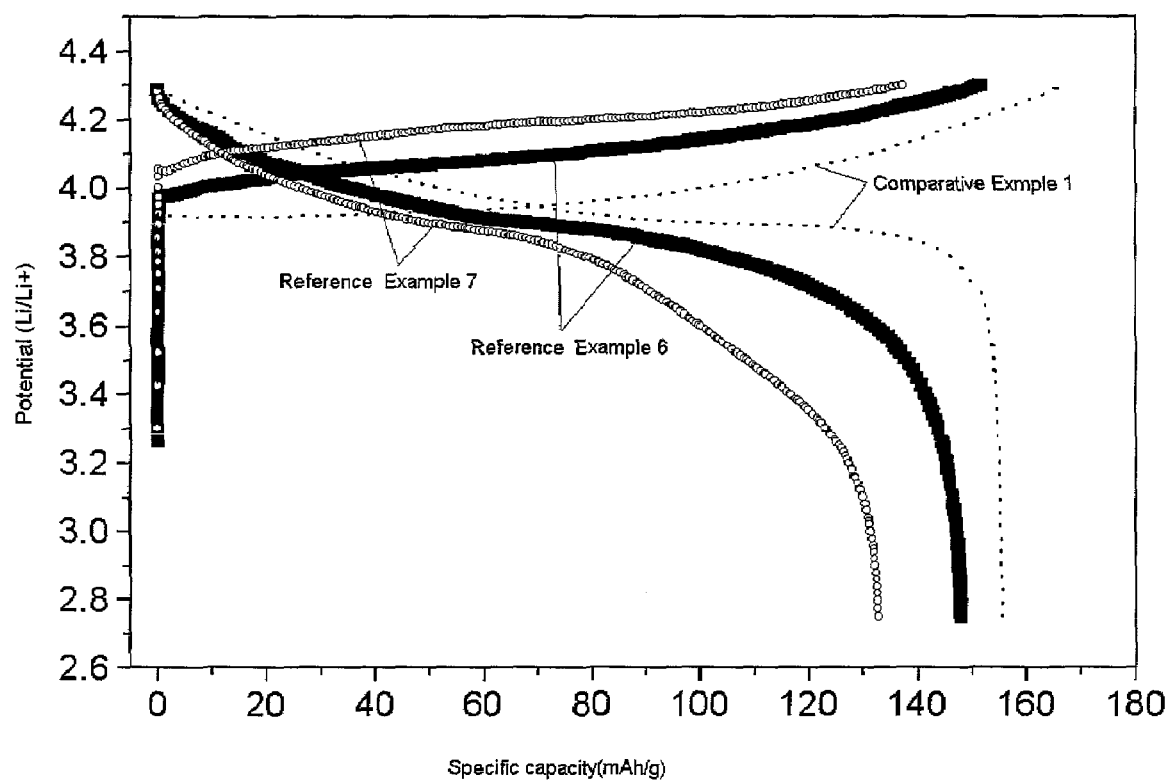
FIG. 13 is a graph showing charge-discharge characteristic of coin-type half-cells fabricated by Example 7 an embodiment of the present invention, Comparative Example 1 and Reference Examples 6 and 7.

Further, to find the improved effects of capability characteristics by adding commercial $B_2O_3$, capability characteristics at a low rate (0.1 C) were measured for coin-type half-cells fabricated by the methods of Comparative Examples 1 and Reference Examples 6 and 7, and the results are illustrated in FIG. 13. As shown in FIG. 13, by adding even small amounts of commercial $B_2O_3$, the capability characteristics are degenerated even less than those of bare $LiCoO_2$.

As mentioned above, the positive active material composition for the rechargeable lithium battery of the present invention includes a thermal-absorbent element-included hydroxide, a thermal-absorbent element-included oxyhydroxide, a thermal-absorbent element-included oxycarbonate, or a thermal-absorbent element-included hydroxycarbonate, so that the resultant battery has been improved in cycle-life and thermal-stability characteristics.

While the present invention has been described in detail with reference to the preferred embodiments, those skilled in the art will appreciate that various modifications and substitutions can be made thereto without departing from the spirit and scope of the present invention as set forth in the appended claims and equivalents thereof.

What is claimed is:

1. A positive active material composition for a rechargeable lithium battery, comprising:
   a positive active material comprising at least one lithiated compound; and
   an amorphous additive compound uniformly mixed throughout the entire positive active material, said amorphous additive compound consisting of a thermal-absorbent element-included hydroxycarbonate,
   wherein said amorphous additive compound comprises an amount at or between 0.1 weight % and 0.3 weight % based on the weight of the positive active material composition and
   wherein the thermal-absorbent element is an element selected from the group consisting of Mg, Al, Co, K, Na, Ca, Si, Ti, Sn, V, Ge, Ga, As, and Zr, and
   wherein the at least one lithiated compound is a compound selected from the group consisting of compounds represented by the formulas 1 to 13:

$$Li_xMn_{1-y}M_yA_2 \quad (1)$$
   $$Li_xMn_{1-y}M_yO_{2-z}X_z \quad (2)$$
   $$Li_xMn_2O_{4-z}X_z \quad (3)$$
   $$Li_xMn_{2-y}M_yA_4 \quad (4)$$
   $$Li_xCo_{1-y}M_yA_2 \quad (5)$$
   $$Li_xCo_{1-y}M_yO_{2-z}X_z \quad (6)$$
   $$Li_xNi_{1-y}M_yA_2 \quad (7)$$
   $$Li_xNi_{1-y}M_yO_{2-z}X_z \quad (8)$$
   $$Li_xNi_{1-y}Co_yO_{2-z}X_z \quad (9)$$
   $$Li_xNi_{1-y-z}Co_yM_zA_\alpha \quad (10)$$
   $$Li_xNi_{1-y-z}Co_yM_zO_{2-\alpha}X_\alpha \quad (11)$$
   $$Li_xNi_{1-y-z}Mn_yM_zA_\alpha \quad (12)$$
   $$Li_xNi_{1-y-z}Mn_yM_zO_{2-\alpha}X_\alpha \quad (13)$$

wherein, $0.95 \leq x \leq 1.1$, $0 \leq y \leq 0.5$, $0 \leq z \leq 05$, $0 \leq \alpha \leq 2$, M is one element selected from the group consisting of Al, Ni, Co, Mn, Cr, Fe, Mg, Sr, V, and rare earth elements, A is selected from the group consisting of O, F, S, and P, and X is selected from the group consisting of F, S, and P.

2. The positive active material composition according to claim 1, wherein the positive active material composition is formed by combining a powder containing the positive active material with a powder containing the additive compound in a solvent to form a positive active material slurry to be coated on a current collector of an electrode of the lithium battery.

3. A positive active material composition for a rechargeable lithium battery comprising:
   a positive active material comprising at least one lithiated compound; and
   an additive compound distributed throughout the entire positive active material, said additive compound consisting of a thermal-absorbent element-included hydroxycarbonate, wherein the thermal-absorbent element is one of amorphous Al and crystalline B, and wherein said additive compound comprises an amount at or between 0.1 weight % and 0.3 weight % based on the weight of the positive active material composition, and
   wherein the at least one lithiated compound is a compound selected from the group consisting of compounds represented by the formulas 1 to 13:

$$Li_xMn_{1-y}M_yA_2 \quad (1)$$
   $$Li_xMn_{1-y}M_yO_{2-z}X_z \quad (2)$$
   $$Li_xMn_2O_{4-z}X_z \quad (3)$$
   $$Li_xMn_{2-y}M_yA_4 \quad (4)$$
   $$Li_xCo_{1-y}M_yA_2 \quad (5)$$
   $$Li_xCo_{1-y}M_yO_{2-z}X_z \quad (6)$$
   $$Li_xNi_{1-y}M_yA_2 \quad (7)$$
   $$Li_xNi_{1-y}M_yO_{2-z}X_z \quad (8)$$
   $$Li_xNi_{1-y}Co_yO_{2-z}X_z \quad (9)$$
   $$Li_xNi_{1-y-z}Co_yM_zA_\alpha \quad (10)$$
   $$Li_xNi_{1-y-z}Co_yM_zO_{2-\alpha}X_\alpha \quad (11)$$
   $$Li_xNi_{1-y-z}Mn_yM_zA_\alpha \quad (12)$$
   $$Li_xNi_{1-y-z}Mn_yM_zO_{2-\alpha}X_\alpha \quad (13)$$

wherein,
   $0.95 \leq x \leq 1.1$, $0 \leq y \leq 0.50$, $0 \leq z \leq 0.5$, $0 \leq \alpha \leq 2$,
   M is one element selected from the group consisting of Al, Ni, Co, Mn, Cr, Fe, Mg, Sr, V, and rare earth elements,
   A is selected from the group consisting of O, F, S, and P, and
   X is selected from the group consisting of F, S, and P.

4. A positive active material composition for a rechargeable lithium battery comprising:
   a positive active material comprising at least one lithiated compound; and
   an additive compound mixed throughout the entire positive active material, said additive compound consisting of a thermal-absorbent element-included hydroxycarbonate, wherein the thermal-absorbent element included hydroxycarbonate is a crystalline B-included hydroxycarbonate, and wherein said thermal-absorbent element-included hydroxycarbonate comprises an amount at or between 0.1 weight % and 0.3 weight % based on the weight of the positive active material composition, and
   wherein the at least one lithiated compound is a compound selected from the group consisting of compounds represented by the formulas 1 to 13:

$$Li_xMn_{1-y}M_yA_2 \quad (1)$$
   $$Li_xMn_{1-y}M_yO_{2-z}X_z \quad (2)$$
   $$Li_xMn_2O_{4-z}X_z \quad (3)$$
   $$Li_xMn_{2-y}M_yA_4 \quad (4)$$
   $$Li_xCo_{1-y}M_yA_2 \quad (5)$$
   $$Li_xCo_{1-y}M_yO_{2-z}X_z \quad (6)$$
   $$Li_xNi_{1-y}M_yA_2 \quad (7)$$

$$Li_xNi_{1-y}M_yO_{2-z}X_z \quad (8)$$

$$Li_xNi_{1-y}Co_yO_{2-z}X_z \quad (9)$$

$$Li_xNi_{1-y-z}Co_yM_zA_\alpha \quad (10)$$

$$Li_xNi_{1-y-z}Co_yM_zO_{2-\alpha}X_\alpha \quad (11)$$

$$Li_xNi_{1-y-z}Mn_yM_zA_\alpha \quad (12)$$

$$Li_xNi_{1-y-z}Mn_yM_zO_{2-\alpha}X_\alpha \quad (13)$$

wherein,
$0.95 \leq x \leq 1.1$, $0 \leq y \leq 0.5$, $0 \leq z \leq 0.5$, $0 \leq \alpha \leq 2$, M is one element selected from the group consisting of Al, Ni, Co, Mn, Cr, Fe, Mg, Sr, V, and rare earth elements, A is selected from the group consisting of O, F, S, and P, and X is selected from the group consisting of F, S, and P.

* * * * *

UNITED STATES PATENT AND TRADEMARK OFFICE
CERTIFICATE OF CORRECTION

PATENT NO.         : 7,507,501 B2
APPLICATION NO. : 10/092300
DATED              : March 24, 2009
INVENTOR(S)        : Ho-Jin Kweon et al.

Page 1 of 1

It is certified that error appears in the above-identified patent and that said Letters Patent is hereby corrected as shown below:

Column 11, line 46, change "$0 \leq z \leq 05$" to --$0 \leq z \leq 0.5$--.

Column 12, line 32, change "$0 \leq y \leq 0.50$" to --$0 \leq y \leq 0.5$--.

Signed and Sealed this

Second Day of June, 2009

JOHN DOLL
*Acting Director of the United States Patent and Trademark Office*